United States Patent
Soley

[19]

[11] Patent Number: 6,062,167
[45] Date of Patent: May 16, 2000

[54] BIRDFEEDER AND BIRDFEEDER KIT

[76] Inventor: James J. Soley, 10 Island Ave., Peaks Island, Me. 04108

[21] Appl. No.: 09/262,216
[22] Filed: Mar. 4, 1999
[51] Int. Cl.[7] .................................................. A01K 39/00
[52] U.S. Cl. ............................................... 119/57.8
[58] Field of Search ................................. 119/57.8, 57.9, 119/484; 47/68

[56] References Cited

U.S. PATENT DOCUMENTS

| | | |
|---|---|---|
| D. 285,847 | 9/1986 | Read . |
| D. 322,694 | 12/1991 | Lane . |
| D. 334,636 | 4/1993 | Honeycutt . |
| D. 347,302 | 5/1994 | Maple . |
| D. 351,690 | 10/1994 | Honeycutt . |
| 4,753,195 | 6/1988 | Maggio . |
| 4,881,491 | 11/1989 | Brown . |
| 4,989,546 | 2/1991 | Cannaday ................. 119/19 |
| 5,016,571 | 5/1991 | Totario . |
| 5,170,747 | 12/1992 | Strangio . |
| 5,676,089 | 10/1997 | Morganson ............ 119/52.3 |
| 5,782,205 | 7/1998 | Veras ....................... 119/484 |
| 5,842,438 | 12/1998 | Messmer ................. 119/165 |
| 5,890,455 | 4/1999 | Donchey ................. 119/484 |
| 5,904,330 | 5/1999 | Manico et al. .......... 119/57.8 |

Primary Examiner—Thomas Price
Attorney, Agent, or Firm—William B. Ritchie

[57] ABSTRACT

A birdfeeder and a birdfeeder kit that includes a frame dimensioned for mounting within a window, a first edge, a second edge, and a floor fixedly attached between the right portion and the left portion of the frame. A viewing enclosure, having a transparent window portion, is rotatably attached to the floor such that the viewing enclosure abuts a second edge of the floor and the frame when in a viewing position, and exposes the floor when rotated to a filling position. In operation, the frame of the birdfeeder may be mounted within a window, the viewing enclosure may be rotated to said filling position to allow a quantity of bird food to be disposed upon the feeding surface of said floor, and the viewing enclosure may be rotated to a viewing position to allow a bird to be observed through the window portion of the viewing enclosure. The preferred birdfeeder includes a photosensitive window portion having a substantially arcuate surface that is held within a channel in the top, bottom, right side and left side of the viewing enclosure, a feeding surface having a tapered rain groove for draining water from the floor and a seed tray removably disposed upon the feeding surface for receiving seeds. It is also preferred that a right side panel and left side panel be attached to the right and left sides of the frame respectively such that the birdfeeder completely occupies a window opening.

20 Claims, 5 Drawing Sheets

BIRDFEEDER AND BIRDFEEDER KIT

FIELD OF THE INVENTION

The present invention relates to the field of birdfeeders and, in particular, to window mounted birdfeeders having large viewing areas

BACKGROUND OF THE INVENTION

Feeding birds has been a popular pastime for many years. People feed birds for a number of reasons, but the primary reason is to attract them so that they may be observed. In order to accomplish this goal of observing the feeding birds, many people mount birdfeeders upon trees or other structures outside of the home and observe the birds through binoculars. Although these outdoor mounted birdfeeders are effective for allowing feeding birds to be observed, the need for binoculars precludes the viewing by multiple people at the same time without the use of multiple pairs of binoculars, or for small children who have difficulty using binoculars. In addition, these birdfeeders require the observer to venture outside for the purpose of refilling the feeder with bird food and, in many cases, to climb a ladder in order to reach the suspended feeder. Finally, these feeders must be completely removed for cleaning and subsequently reattached, again requiring the observer to venture outdoors and to climb a ladder.

In order to overcome the need for binoculars to adequately observe feeding birds, a number of other birdfeeders have been developed for mounting onto the outside of windows using suction cups, or to outer windowsills using traditional fasteners so that birds may be closely observed by the naked eye. Examples of these types of birdfeeders are disclosed in U.S. Pat. No. 4,753,195 and U.S. Pat. No. Des. 334,636. These birdfeeders allow feeding birds to be observed through a window with the naked eye. However, it is difficult to fill these feeder without removing them from their mounting point or venturing outdoors in a manner similar to that of remotely mounted feeders. In addition, it is nearly impossible to adequately clean these feeders from inside of the home without removing them.

In order to allow an observer to observe feeding birds with the naked eve while avoiding the need to venture outdoors, or to climb a ladder, to refill the birdfeeder, a number of window mounted birdfeeders have been developed. These feeders generally mount between an open double hung window and a sash and provide a transparent wall that allows an observer sitting in a room to view the feeding birds. The first such window mounted bird feeder was proposed in 1915 by the National Association of Audubon Societies. This feeder mounted within the window and could be refilled or cleaned by completely removing the feeder from the window and subsequently replacing it. Although this birdfeeder overcame the drawbacks of traditional outdoor mounted feeders, the need to completely remove the feeder in order to fill it was seen as a drawback as weatherstripping and the like lodged between the edges of the feeder and the window frame would need to be replaced each time the feeder was refilled or cleaned.

Another window mounted birdfeeder is described in U.S. Pat. No. 4,881,491, titled "Window Bird Feeder". This birdfeeder has a rectangular body with translucent rear and sidewalls, an open front, and a hinged top to allow the feeder to be refilled. This birdfeeder does not need to be removed in order be refilled. However, the hinged top limits the viewing area of the feeder and makes the feeder difficult to clean without removing the feeder completely from the window.

U.S. Pat. No. Des. 351,690, titled "Window Mounted Bird Feeder", describes a window mounted feeder having a glass panel that faces the inside of the window, an open front, a rotatable feed perch, and a door on the side of the inside portion of the feeder to allow the feeder to be refilled. Like the feeder described in U.S. Pat. No. 4,881,491, this feeder does not need to be removed in order to be refilled. However, this feeder is also difficult to clean without complete removal and, though slightly enhancing the viewing area, the single planar sheet of glass still limits the area available for viewing the birds.

Therefore, there is a need for a window mounted birdfeeder that does not need to be removed to be filled, that does not need to be removed to be cleaned, and that provides a large viewing area through which to observe feeding birds.

SUMMARY OF THE INVENTION

The present invention is a birdfeeder and a birdfeeder kit that does not need to be removed to be filled, does not need to be removed to be cleaned, and that provides a large viewing area through which to observe feeding birds. In its most basic form, the birdfeeder of the present invention includes a frame dimensioned for mounting within a window, a first edge, a second edge, and a floor fixedly attached between the right portion and the left portion of the frame. A viewing enclosure, having a transparent window portion, is rotatably attached to the floor such that the viewing enclosure abuts a second edge of the floor and the frame when in a viewing position, and exposes the floor when rotated to a filling position. In operation, the frame of the birdfeeder may be mounted within a window, the viewing enclosure may be rotated to said filling position to allow a quantity of bird food to be disposed upon the feeding surface of said floor, and the viewing enclosure may be rotated to a viewing position to allow a bird to be observed through the window portion of the viewing enclosure.

The preferred birdfeeder includes a photosensitive window portion having a substantially arcuate surface that is held within a channel in the top, bottom, right side and left side of the viewing enclosure. The preferred birdfeeder also includes a feeding surface having a tapered rain groove for draining water from the floor and seed tray removably disposed upon the feeding surface for receiving seeds. It is also preferred that a right side panel and left side panel be attached to the right and left sides of the frame respectively such that the birdfeeder completely occupies a window opening. In some embodiments, one or both of these panels are expandable, while in the preferred embodiment, the panels are solid and are cut to fit the window in which the birdfeeder is mounted.

Therefore, it is an aspect of the invention to provide a birdfeeder and kit that does not need to be removed to be filled.

It is a further aspect of the invention to provide a birdfeeder and kit that does not need to be removed to be cleaned.

It is a further aspect of the invention to provide a birdfeeder and kit that provides a large viewing area through which to observe feeding birds.

It is a further aspect of the invention to provide a birdfeeder and kit that may be installed into a window without the need for mechanical attachment.

It is a further aspect of the invention to provide a birdfeeder and kit that allows the window to be closed and locked without removal of the birdfeeder.

It is a further aspect of the invention to provide a birdfeeder and kit that allows water to easily drain from the feeding surface.

It is a still further aspect of the invention to provide a birdfeeder and kit that includes a seed tray to allow seeds to dry and, accordingly, prevent seeds from rotting.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
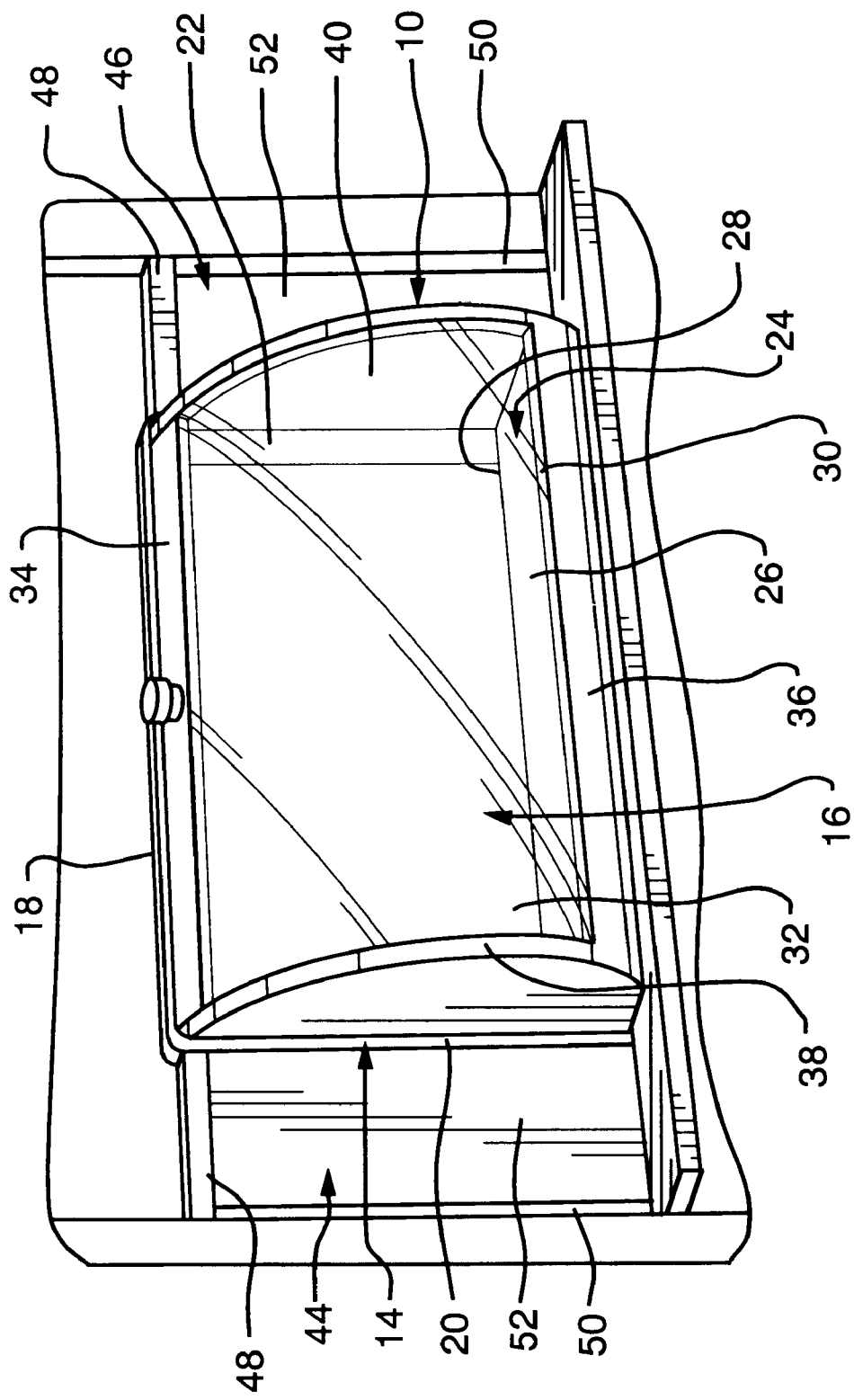
FIG. 1 is a front perspective view of one embodiment of the birdfeeder of the present invention in a viewing position within a window.

Referring first to FIG. 1, one embodiment of the birdfeeder 10 of the present invention is shown mounted in a viewing position within a window opening. As shown in FIG. 1, the birdfeeder 10 includes a frame 14 and a viewing enclosure 16 that is rotatably connected to the frame. The frame 14 is dimensioned for mounting within a window and includes a top 18, a right portion 20, a left portion 22 and a floor 24 having a feeding surface 26, a first edge 28, and a second edge 30 (shown more clearly in FIG. 2), which is preferably rounded to allow rotation of the viewing enclosure 16. The floor 24 is fixedly attached between the right portion 20 and left portion 22 of the frame and extends outward from the frame to a position abutting the viewing enclosure 16 when in a viewing position.

The viewing enclosure 16 is rotatably attached to the floor 24 of the frame 14 such that said viewing enclosure 16 abuts the second edge 30 of the floor, and the top 18, right portion 20, and left portion 22 of the frame when in a viewing position. In the preferred embodiment, the viewing enclosure 16 includes a top 34, a bottom 36, a substantially arcuate right side 38, a substantially arcuate left side 40, a reinforcing member 42 (shown in FIG. 2) and a window portion 32 having a substantially arcuate surface. However, in other embodiments a square viewing enclosure 16 is utilized, while in still others a viewing enclosure 16 having a sloped front window portion 32 is substituted to achieve similar results.

The window portion 32 is securely mounted within channels cut into the top 34, bottom 36, right side 38 and left side 40 and is sealed with a weather-stripping material (not shown) that is disposed between the window portion 32 and the bottom of each channel. Window portion 32 is preferably manufactured of a substantially transparent plastic material that is coated with a film to transform the window portion 32 into photosensitive window. In this embodiment, birds feeding within the feeder cannot see inside of the dwelling and observers within the dwelling may see the birds, when the light level outside of the dwelling exceeds the level within the dwelling. In other embodiments, however, a fully transparent window portion is utilized.

In the preferred embodiment a pair of side panels 44, 46 are removably attached to the right portion 20 and left portion 22 of the frame, respectively. These side panels preferably include a top brace 48 and a side brace 50 between which a panel sheet 52 is disposed. It is preferred that a polyvinyl chloride material, such as SINTRA® board, be used for the panel sheets 52 as this material is easily scored and cut using common straight edged implements. However, it is recognized that a number of commonly utilized materials, such a wood, plastic, paperboard, rubber, or the like may be utilized to achieve similar results. It is likewise preferred that the side braces 50 be plastic U-channel members having a self-adhesive on its outside surface to allow the side braces 50 to be secured to the sides of the window frame (not shown). As further discussed with reference to FIG. 5, although the side panels 44, 46 are preferably of fixed dimension, expandable side panels 44, 46, such as those commonly utilized in connection with air conditioners or window mounted fans, may also be utilized. It is also recognized that the side panels 44, 46 may be completely eliminated and the frame 14 dimensioned to completely occupy the window opening.

Figure 2:
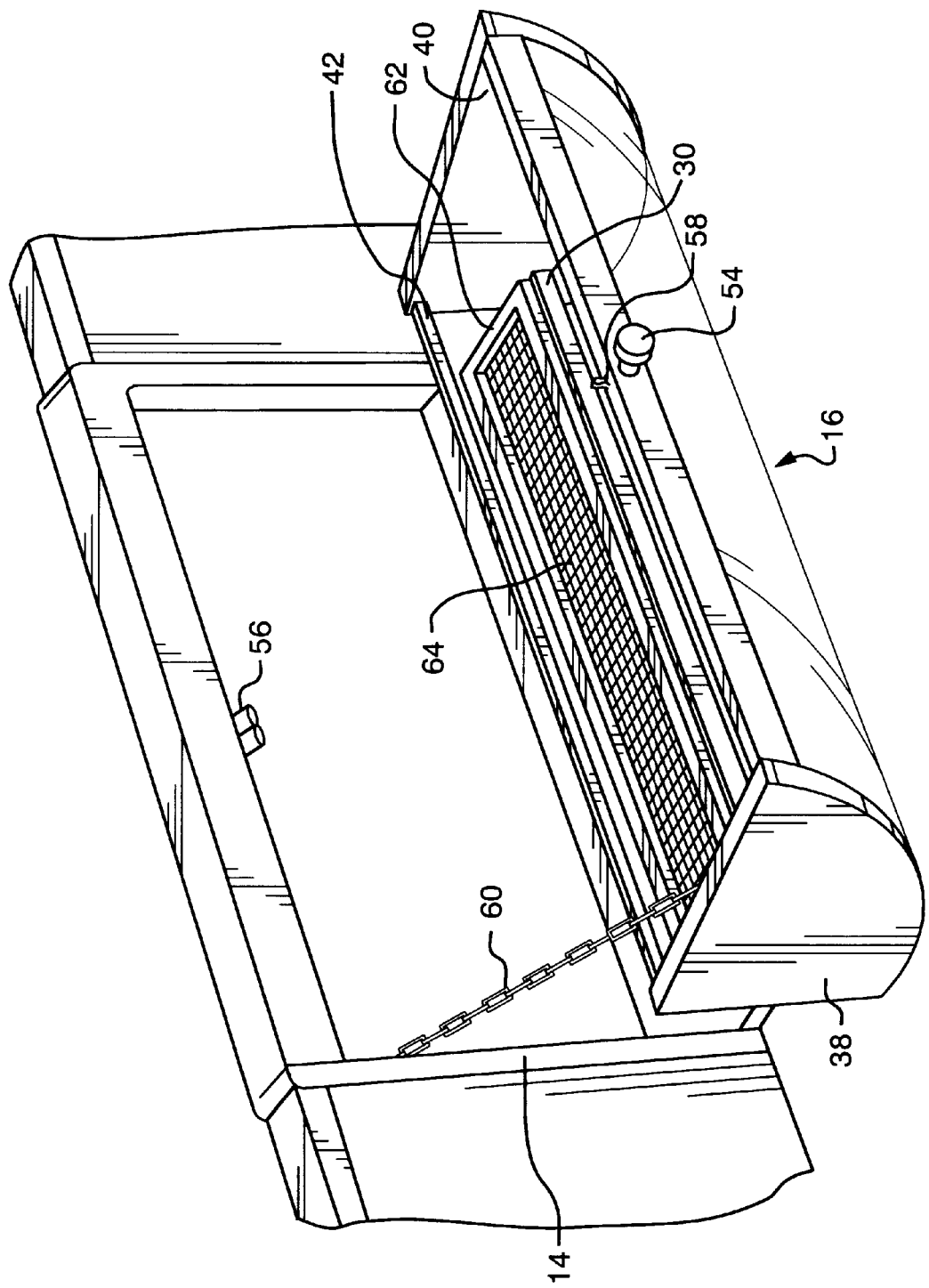
FIG. 2 is a view front perspective view of the preferred embodiment of the birdfeeder in a filling position within the window.

Referring now to FIG. 2, the preferred embodiment of the birdfeeder 10 is shown with the viewing enclosure 16 in a filling position. In order to move the enclosure 16 from the viewing position, a user will grasp and pull the handle 54, disposed at the top 34 of the viewing enclosure, such that the holding force exerted by roller catch 56 on enclosure mounted latch 58 is overcome. The viewing enclosure 16 is then rotated until it is stopped by chain 60, which is connected between the frame 14 and viewing enclosure 16 and dimensioned to prevent the viewing enclosure 16 from over-rotating and striking the area below the window. In this position, FIG. 2 also shows the reinforcing member 42 and seed tray 62 of the preferred embodiment. Reinforcing member 42 is disposed between the two sides 38, 40 of the viewing enclosure 16 and provides added structural stability to the enclosure 16. Seed tray 62 is removably disposed upon floor 24 and includes a mesh bottom 64 to allow drying of seeds that are dampened by the weather. Such drying is desirable as it prevents seeds and the floor 24 from retaining moisture and rotting.

Figure 3:
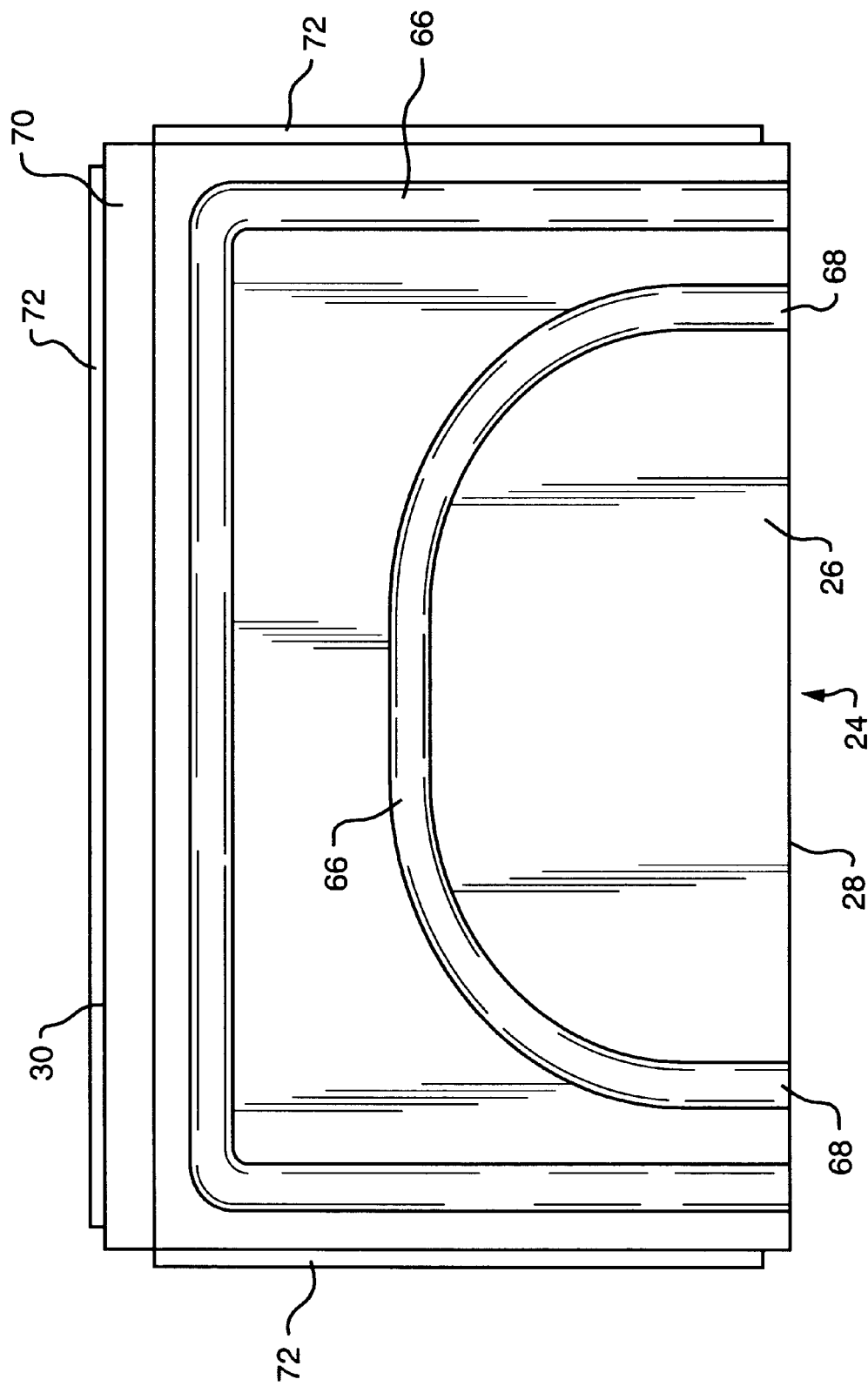
FIG. 3 is a top view of the preferred floor of the birdfeeder of the present invention.

Referring now to FIG. 3, a top view of the preferred floor 24 is shown. The preferred floor 24 includes a substantially planar feeding surface 26 into which is machined at least one tapered rain groove 66 for draining standing water from the feeding surface 26. As shown in FIG. 3, a first tapered rain groove 66 is preferably disposed proximate the outer periphery of the floor 24 such that rain water does not drain within the dwelling and a second tapered rain groove 66 is disposed through the central portion of the feeding surface 26 to prevent any pooling of water in pockets created through the warping of the feeding surface 26. Each tapered rain groove 66 is tapered such that gravity forces water within each groove 66 to drain from exits 68 along the first edge 28 of the floor 24. A lip member 70 is disposed along the second edge 30 to prevent water from being blown into the dwelling by wind and sections of weather-stripping 72 are disposed along the outside edges of the floor 24 such that they will mate with and seal the bottom, right side 38 and left side 40 of the viewing enclosure 16.

Figure 4:
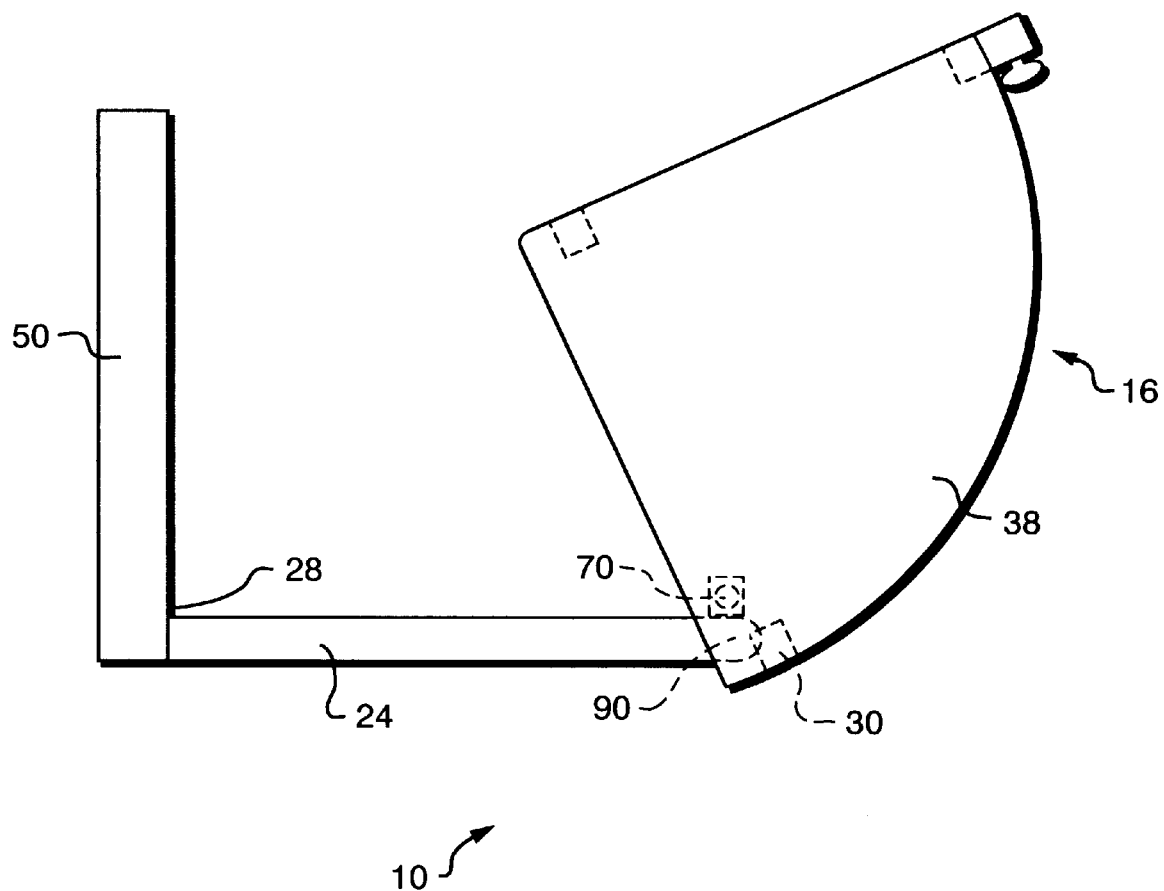
FIG. 4 is a side view showing the rotatable attachment of one embodiment of the viewing enclosure and the frame of the birdfeeder in a filling position.

Referring next to FIG. 4, a side view of the preferred birdfeeder 10 is shown in with the viewing enclosure 16 rotated to a filling position. In this embodiment, the viewing enclosure 16 is rotated about pins 90 that extend from the right and left sides of the floor 24 a points adjacent the second edge 30. The pins 90 mate with openings in the right side 38 and left side 40 (not shown) of the viewing enclosure and are dimensioned to allow the viewing enclosure 16 to be rotated about the pins 90 while maintaining the viewing enclosure 16 in position relative to the floor 24 of the birdfeeder 10. It is recognized, however, that other means for rotating the viewing enclosure may also be utilized. For example, in some embodiments, the openings in the right side 38 and left side 40 may be replaced by a pair of channels to allow the viewing enclosure 16 to be slid forward and then rotated about the pins 90, while in other embodiments, a piano or other type hinge may be utilized to rotatably join the floor 24 and viewing enclosure 16.

Figure 5:
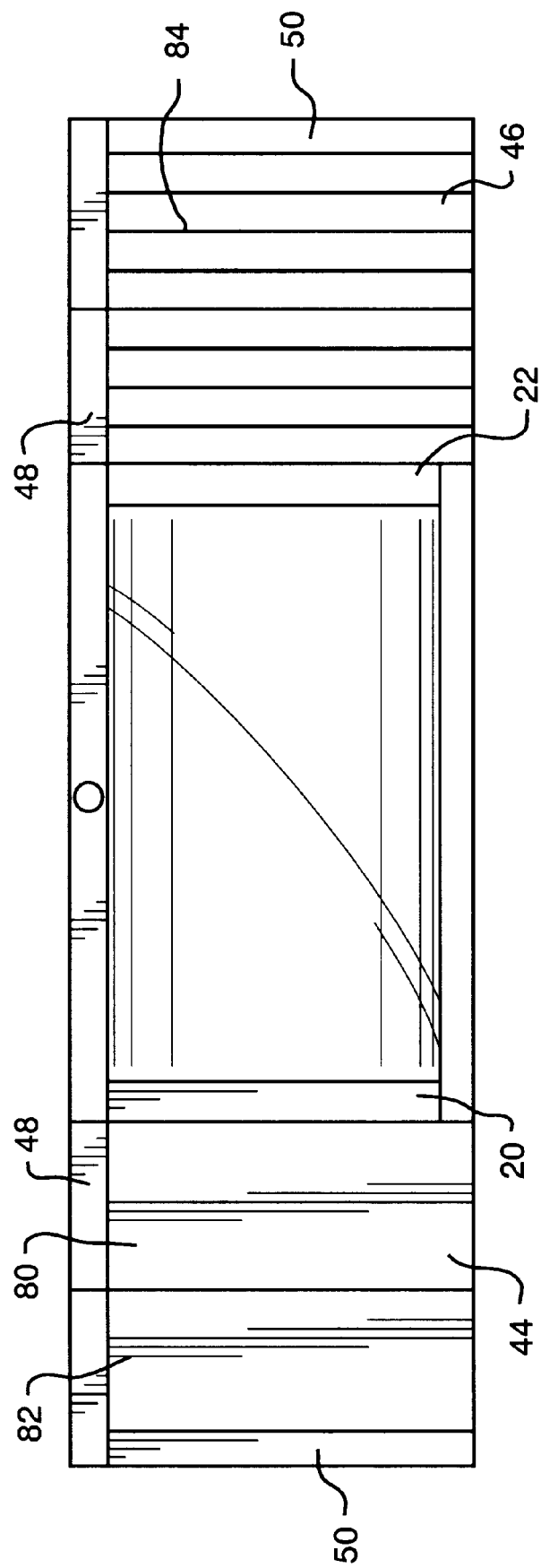
FIG. 5 is a front view showing two embodiments of an expandable side panel for attachment to the frame of the birdfeeder.

Referring now to FIG. 5, a front view of the birdfeeder showing two expandable side panels 44, 46 attached to the right portion 20 and left portion 22 of the frame, respectively. As shown in FIG. 5, the right side panel 44 includes two substantially planar panel sheets 80, 82, a side brace 50 and an expandable top brace. In this embodiment, the side panel sheets 80, 82 are dimensioned to allow one side panel sheet 80 to overlap the other side panel sheet 82 to allow the side panel 44 to cover the entire widow opening. As also shown in FIG. 6, the left side panel 46 includes a flexible accordion panel material 84, such as those commonly utilized with room type air conditioners, a side brace 50 and an expandable top brace 48. As was the case with the right side panel 44, the right side panel 46 may be expanded or retracted to fit the opening of the window. It should be recognized that either style of expandable side panel 44, 46 may be utilized for either side and that other structures for the expandable side panels will be readily apparent to those of ordinary skill in the art.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A birdfeeder comprising:
   a frame dimensioned for mounting within a window, said frame having a top, a right portion, a left portion and a floor having a feeding surface, a first edge, and a second edge, wherein said floor is fixedly attached between said right portion and said left portion of said frame;
   a viewing enclosure comprising a window portion, said viewing enclosure being rotatably attached to said floor such that said viewing enclosure abuts said second edge of said floor and said top, said right portion, and said left portion of said frame when in a viewing position, and exposes said floor when rotated to a filling position;
   wherein said frame of said birdfeeder may be mounted within a window, said viewing enclosure may be rotated to said filling position to allow a quantity of bird food to be disposed upon said feeding surface of said floor, and said viewing enclosure may be rotated to a viewing position to allow a bird to be observed through said window portion of said viewing enclosure;
   wherein said viewing enclosure further comprises a top, a bottom, a substantially arcuate right side, and a substantially arcuate left side; and
   wherein said window portion of said viewing enclosure has a substantially arcuate surface.

2. The birdfeeder as claimed in claim 1 wherein said top, said bottom, said right side and said left side of said viewing enclosure each comprise a channel dimensioned to receive said window portion.

3. The birdfeeder as claimed in claim 1 further comprising a seed tray removably disposed upon said feeding surface for receiving seeds.

4. The birdfeeder as claimed in claim 1 wherein said feeding surface of said floor comprises a tapered rain groove for draining water from said floor.

5. The birdfeeder as claimed in claim 1 further comprising a right side panel removably attached to said right side of said frame and a left side panel removably attached to said left side of said frame, said right side panel and said left side panel being dimensioned such that said birdfeeder completely occupies a window opening.

6. The birdfeeder as claimed in claim 5 wherein said right side panel is expandable.

7. The birdfeeder as claimed in claim 5 wherein said left side panel is expandable.

8. The birdfeeder as claimed in claim 1 wherein said window portion of said viewing enclosure is a photosensitive window for allowing an observer to observe said bird and preventing said bird from observing said observer.

9. A birdfeeder kit comprising:
   a frame dimensioned for mounting within a window, said frame having a top, a right portion, a left portion and a floor having a feeding surface, a first edge, and a second edge, wherein said first edge is fixedly attached between said right portion and said left portion of said flame; and
   a viewing enclosure comprising a window portion, said viewing enclosure being dimensioned to for rotatable attachment to said floor of said frame such that said viewing enclosure abuts said second edge of said floor and said top, said right portion, and said left portion of said frame when in a viewing position, and exposes said floor when rotated to a filling position;
   wherein said kit may be assembled such that said frame of said birdfeeder may be mounted within a window, said viewing enclosure may be rotated to said filling position to allow a quantity of bird food to be disposed upon said feeding surface of said floor, and said viewing enclosure may be rotated to a viewing position to allow a bird to be observed through said window portion of said viewing enclosure.

10. The birdfeeder kit as claimed in claim 9 wherein said viewing enclosure further comprises a top, a bottom, a substantially arcuate right side, and a substantially arcuate left side, and wherein said window portion of said viewing enclosure has a substantially arcuate surface.

11. The birdfeeder kit as claimed in claim 10 wherein said top said bottom, said right side and said left side of said viewing enclosure each comprise a channel dimensioned to receive said window portion.

12. The birdfeeder kit as claimed in claim 9 further comprising a seed tray for removable disposition upon said feeding surface of said floor for receiving seeds.

13. The birdfeeder kit as claimed in claim 9 wherein said feeding surface of said floor comprises a tapered rain groove for draining water from said floor.

14. The birdfeeder kit as claimed in claim 9 further comprising a right side panel dimensioned for removable attachment to said right side of said frame and a left side panel dimensioned for removable attachment to said left side of said frame, said right side panel and said left side panel being dimensioned such that said assembled birdfeeder completely occupies a window opening.

15. The birdfeeder kit as claimed in claim 14 wherein said right side panel is expandable.

16. The birdfeeder kit as claimed in claim 14 wherein said left side panel is expandable.

17. The birdfeeder kit as claimed in claim 9 wherein said window portion of said viewing enclosure is a photosensitive window for allowing an observer to observe said bird and preventing said bird from observing said observer.

18. A birdfeeder comprising:

a frame dimensioned for mounting within a window, said frame having a top, a right portion, a left portion and a floor having a feeding surface, a first edge, and a second edge, wherein said floor is fixedly attached between said right portion and said left portion of said frame;

a viewing enclosure comprising a window portion, said viewing enclosure being rotatably attached to said floor such that said viewing enclosure abuts said second edge of said floor and said top, said right portion, and said left portion of said frame when in a viewing position, and exposes said floor when rotated to a filling position;

wherein said frame of said birdfeeder may be mounted within a window, said viewing enclosure may be rotated to said filling position to allow a quantity of bird food to be disposed upon said feeding surface of said floor, and said viewing enclosure may be rotated to a viewing position to allow a bird to be observed through said window portion of said viewing enclosure;

wherein said feeding surface of said floor comprises a tapered rain groove for draining water from said floor.

19. The birdfeeder as claimed in claim 18 further comprising a right side panel removably attached to said right side of said frame and a left side panel removably attached to said left side of said frame, said right side panel and said left side panel being dimensioned such that said birdfeeder completely occupies a window opening.

20. The birdfeeder as claimed in claim 18 wherein said window portion of said viewing enclosure is a photosensitive window for allowing an observer to observe said bird and preventing said bird from observing said observer.

* * * * *